US010152652B2

(12) United States Patent
Hardikar et al.

(10) Patent No.: US 10,152,652 B2
(45) Date of Patent: Dec. 11, 2018

(54) SELECTING A DEVICE WITH VISUAL CONFIRMATION IN THE INTERNET OF THINGS

(71) Applicant: International Business Machines Corporation, Armonk, NY (US)

(72) Inventors: Dilip V. Hardikar, Pune (IN); Baiju D. Mandalia, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 301 days.

(21) Appl. No.: 14/864,822

(22) Filed: Sep. 24, 2015

(65) Prior Publication Data

US 2017/0090840 A1    Mar. 30, 2017

(51) Int. Cl.
*G06F 15/173*    (2006.01)
*G06K 9/62*    (2006.01)
*G06F 3/12*    (2006.01)
*G06K 9/00*    (2006.01)

(52) U.S. Cl.
CPC ......... *G06K 9/6217* (2013.01); *G06F 3/1204* (2013.01); *G06F 3/126* (2013.01); *G06F 3/1226* (2013.01); *G06F 3/1229* (2013.01); *G06F 3/1292* (2013.01); *G06K 9/00771* (2013.01)

(58) Field of Classification Search
CPC ......... G06K 9/6217; G06K 9/00771; G06F 3/1204; G06F 3/1226; G06F 3/1229; G06F 3/126; G06F 3/1292
USPC ........................................ 709/243
See application file for complete search history.

(56) References Cited

U.S. PATENT DOCUMENTS

| 7,187,462 | B2 | 3/2007 | Oakeson et al. |
| 8,134,724 | B2 | 3/2012 | Kephart et al. |
| 8,302,166 | B2 | 10/2012 | Balakrishnan et al. |
| 2008/0225326 | A1* | 9/2008 | Kephart ............ G06Q 30/0261 358/1.15 |
| 2014/0266698 | A1* | 9/2014 | Hall ...................... H04W 4/021 340/539.13 |
| 2015/0016798 | A1* | 1/2015 | Fujimatsu .......... G06K 9/00362 386/223 |

(Continued)

OTHER PUBLICATIONS

IBM Software; IBM Presence Zones, Gain insight to in-store customer behavior and engage shoppers in real-time, Oct. 2013.

(Continued)

*Primary Examiner* — Joseph L Greene
(74) *Attorney, Agent, or Firm* — Garg Law Firm, PLLC; Christopher K. McLane (57) ABSTRACT

A determination is made that an instruction has to be sent for processing in the IoT environment. A set of devices is located in the IoT environment. The set of devices includes the device and each device in the set of devices can execute the instruction for a similar outcome. For each device in a subset of the set of devices, a set of factors is collected, including an image of a portion of each device. For the device, a first weight is assigned to a feature of the device extracted from an image of a portion of the device, and a second weight is assigned to a feature of another device extracted from another image of a portion of the other device. When the first weight is greater than the second weight, the device is selected from the subset as a target for sending the instruction.

17 Claims, 6 Drawing Sheets

(56) References Cited

U.S. PATENT DOCUMENTS

2015/0332463 A1* 11/2015 Galera ............... G06K 9/00771
                                                              382/103
2016/0217587 A1*  7/2016 Hay ......................... G06T 7/11
2017/0053169 A1*  2/2017 Cuban .................... H04N 7/185
2017/0077764 A1*  3/2017 Bell ........................ H02J 7/025

OTHER PUBLICATIONS

Wikipedia, Internet of Things, https://en.wikipedia.org/wiki/Internet_of_Things, Jul. 30, 2015, at 12:29.
IBM Big Data and Analytics,The Internet of Things, http://www-01.ibm.com/software/info/internet-of-things/iot-prod/iot-an, 2015.

* cited by examiner

FIGURE 6

SELECTING A DEVICE WITH VISUAL CONFIRMATION IN THE INTERNET OF THINGS

TECHNICAL FIELD

The present invention relates generally to a method, system, and computer program product for selecting a device to use from a plurality of devices in a given data processing environment. More particularly, the present invention relates to a method, system, and computer program product for selecting a device with visual confirmation in an IoT environment.

BACKGROUND

Internet of Things (IoT) is essentially a network of a variety of devices, which through embedded sensors, other hardware, and software are able to communicate with each other over a data communication infrastructure according to a standard or specification. It is contemplated within IoT that devices such as refrigerators, thermostats, lighting appliances, vending machines, access-control devices, peripherals, and many other devices in everyday use (collectively referred to hereinafter as "device" or "devices"), will be able to communicate and interoperate with each other using such an infrastructure.

Each device in the IoT implements the necessary components to interoperate on the specified IoT infrastructure. It is very likely, and perhaps even desirable that many devices be available in the IoT to offer the same or similar services, or to offer a particular use to a user. A user should be able to select from the several devices, a device to use for the user's purpose.

Regardless of the amount of communication between the devices, and the availability of the devices' status to the user, there is often some glitch, some lack of information, or some actual circumstances of a device, which might prevent the use of that device by the user. Consider an office building as an example environment where several printers are operating as IoT devices. Presently, the printers can communicate a host of information to a user's computing device that wants to use one of those printers.

For example, a printer can presently inform a user's computer whether the printer is online or offline, a toner level in the printer, a status of consumables in a paper tray, a number of print jobs presently in the queue, and the like. In some cases, such information flows from a printer, through a print-server, over a data network, to a user's computer.

Regardless of the availability of such information, it is a very common situation in an office environment for a user to send a print job to an available online printer, which has sufficient toner and paper, walk to the printer to find an actual condition of the printer rendering the printer incapable of finishing the user's print job. For example, the user may find that the printer is actually offline—an actual condition of the printer, but an old or incompatible device driver on the user's computer caused an erroneous status indication on the user's computer. As another example, the user may find that while the printer reported as available, a job that was being printed at the time caused a paper jam in the printer—an actual condition of the printer—that was either not reported by the printer or was reported too late after the user had already selected the printer for sending the user's job.

SUMMARY

The illustrative embodiments provide a method, system, and computer program product for selecting a device with visual confirmation in an IoT environment. An embodiment includes a method for selecting a device in an Internet of Things (IoT) environment. The embodiment determines that an instruction has to be sent for processing in the IoT environment. The embodiment locates, relative to a mobile data processing system a set of devices in the IoT environment, wherein the set of devices includes the device and each device in the set of devices can execute the instruction for a similar outcome. The embodiment collects, for each device in a subset of the set of devices, a set of factors, the set of factors including an image of a portion of each device. The embodiment assigns, for the device, a first weight to a feature of the device extracted from an image of a portion of the device. The embodiment assigns, for another device, a second weight to a feature of the other device extracted from another image of a portion of the other device. The embodiment selects, responsive to the first weight being greater than the second weight, the device from the subset as a target for sending the instruction.

Another embodiment includes a computer program product for selecting a device in an Internet of Things (IoT) environment, the computer program product comprising one or more computer-readable storage devices, and program instructions stored on at least one of the one or more storage devices.

Another embodiment includes a computer system for selecting a device in an Internet of Things (IoT) environment, the computer system comprising one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

An office environment with several printers is used as a non-limiting illustrative example for describing the various illustrative embodiments and their operations. The printers are example IoT devices, and the office environment is an example IoT environment. From this disclosure, those of ordinary skill in the art will be able to adapt an embodiment for use with other types of IoT devices, in other types of IoT environments, and the same are contemplated within the scope of the illustrative embodiments.

For example, a problem of selecting the most suitable printer for a mobile user in an office environment can be adapted to find the best stocked vending machine in nearest a patron in a stadium, to find the most recently cleaned facilities near a traveler in an airport, and in many other circumstances involving different types of IoT devices and environments. Such adaptations, other IoT devices, and other IoT environments are contemplated within the scope of the illustrative embodiments.

Generally, within the scope of the illustrative embodiments, a reference to an IoT device includes resources, facilities, tools, appliance, and other systems, which either include an embedded IoT device, or are otherwise configured to operate as an IoT device. For example, a vending machine may include an IoT device within the machine, a refrigerator's processing module may be configured to operate in a given IoT infrastructure, sanitary facilities at an airport may have embedded IoT devices therein, a cash-register's processing module may be configured to operate on an IoT infrastructure, and the like.

Assume a typical office environment comprising a group of building, each with several floors. Assume that many printers are available at different locations on different floors of different buildings.

A user moves about in the office environment with a computing device, such as a laptop computer, a tablet computer, a smartphone, or other portable computing device. As the user moves from one floor to another and from one building to the other, printing a document could become a daunting task for the user. Presently, the user has to physically locate the nearest printer, install a compatible device driver for that printer on the user's computing device, and then print the document.

Even if the status information of the printer suggests that the printer is online and operational, it does not necessarily mean that the user's document will be printed. For example, there could be any number of actual conditions at the printer as described earlier, which may either not be identifiable from the status information, or may occur in a time and manner for which the status information is insufficient or untimely.

Presently, faced with such circumstances, in some cases, the user has to physically walk up to the printer, examine the printer, and resolve the issue with the printer to accomplish the user's print job. In other cases, the user is unsuccessful in resolving the issue at the printer, and the user begins this cycle of finding a suitable printer all over again.

Similarly, a user in a stadium may go to a concessions stand, await his turn in a long line, and upon reaching the cashier find that the refrigerator at the concession stand has run out of the user's desired item. At the same time, the user is unaware that another concession stand on another level of the stadium not only has the item stocked in a refrigerator at that location, the cash register at that location is idle due to a lack of patrons.

The illustrative embodiments used to describe the invention generally address and solve the above-described problems and other problems related to finding the nearest and most suitable device to satisfy a need or to fulfill a job specified by a user. The illustrative embodiments provide a method, system, and computer program product for selecting a device with visual confirmation in an IoT environment.

An embodiment detects a mobile user's location in a given IoT environment. The location detection can be accomplished in any suitable manner, including but not limited to detecting a position of a computing device or a portable device associated with the user using an access point multi-angulation (e.g., Wi-Fi or other near-field triangulation), Radio Frequency IDentification (RFID) sensing, beacon-based detection or multi-angulation (e.g., Bluetooth or other near-field beacon based triangulation), cellular triangulation, Global Positioning System (GPS) based location determination, or a combination these and other methods of location detection.

Once a user's location is determined in a given environment, the embodiment identifies a set of devices present and available for use by the user in the given environment. The embodiment uses the known or last-known position of a device from a repository or server, to select a device in the set according to some rule or restriction. For example, a user on the tenth floor of an office building may not want to know about or use a printer located on the thirtieth floor of the building, even if that printer is available. Accordingly, a user-set preference, a default rule, or a configuration parameter of the embodiment may be that the search for available and usable devices should be limited to a specific range or distance from the user. The distance can be lateral distance, vertical distance, or a combination thereof.

An embodiment determines whether a device is available and usable before including the device in the set. As a non-limiting example, the embodiment can determine whether a printer is available for use by receiving the status information that the printer provides to a print-server, spooler, or another application with which the embodiment can communicate and receive such status information.

An embodiment further determines whether an available device is usable by the user for the user's intended purpose. For example, just because a printer is available for printing, it does not follow that any user can send any print job to that server. In many environments, access to certain devices may be controlled by access permissions, authorizations, and other access control mechanisms.

For example, certain users may be permitted or prohibited from using a device; certain jobs may be permitted or prohibited from executing using the device; or a device may select a user or a job using a device-specific configuration. Using a user's profile, a job profile of the job or task the user wishes to perform using the device, a configuration or profile of the device, or a combination thereof, the embodiment determines whether the available device is usable by the user for the job.

Once a set of available and usable devices is identified, an embodiment establishes an actual state of each device in the set. As one part of establishing a state or status of a device, the embodiment collects the status information provided by the device. For example, the device-provided status information may suggest that the device is online by setting an "online" flag to a value 1. In a similar manner, the device-provided information may suggest that the device has 90 percent of toner left, has paper in paper tray 1, and has ten jobs in the printer's queue.

As another part of establishing the state of a device, an embodiment collects image or video data about the device to establish the device's actual state at the given time. For example, in accordance with an illustrative embodiment, an imaging device, such as a still-image or video camera, is associated with the device. The imaging device captures an image of the device when the actual state is to be determined. The imaging device provides the image to the embodiment. The embodiment uses an existing image analysis tool to analyze and interpret device-specific information from the image. The analyzed device-specific information is indicative of the actual state of the device at the given time.

In one embodiment, the imaging device is associated with the device by virtue of imaging device being installed relative to the device in such a manner that the device or a portion thereof is in a field of view of the imaging device. For example, a printer device may be placed on a stand against one wall of a room and a camera may be installed on the opposite wall of the room and pointing in the direction of the printer such that the camera's view includes an image of the entire printer as viewed from the camera's perspective.

As another example, a printer device may be placed on a stand against one wall of a room and a camera may be installed on the stand and pointing in the direction of the printer such that the camera's view includes an image of a portion of printer, e.g., a screen of the printer or a part of a paper path in the printer, as viewed from the camera's perspective.

As another example, a camera may be installed inside a printer device and pointing in the direction of a part of the printer such that the camera's view includes an image of the part of printer, e.g., a drum or a roller in the printer, as viewed from the camera's perspective.

Furthermore, in one embodiment, the imaging device provides continuous or periodic images of the associated device or a portion thereof. When an embodiment has to establish an actual state of the device, the embodiment selects the most current image of the device or the portion of the device at that time.

In another embodiment, the imaging device provides an image of the associated device or a portion thereof on demand. When an embodiment has to establish an actual state of the device, the embodiment requests an image of the device or the portion of the device at that time. The imaging device captures the image of the device or the portion and sends the image to the embodiment.

From the set of devices, an embodiment selects a subset of those devices whose status information and actual states indicate that those devices are physically and currently available for use by the user. The embodiment plots the subset of devices on a map. The map comprises geographical information representative of the physical space in which the user and the subset of devices are located. Some non-limiting examples of the maps contemplated within the scope of the illustrative embodiments include cartographical drawings, campus or grounds layout, building plans, floor plans, and other two-dimensional representation of a three-dimensional space.

Once a subset of available and usable devices is identified, mapped, and their actual states have been established, an embodiment selects a device from the subset to use for the job. For example, the embodiment associates a set of factors with each device in the subset, and assigns a weight to each factor of each device.

For example, one factor is a distance of the device from the user. The nearer the device to the user, the higher the weight of the distance factor of the device.

Another example factor is a job queue of the device in which the user's job would be sequenced. The shorter the queue, the higher the weight of the queue factor of the device.

Another example factor is a status of the device as determined by the status or configuration information supplied by the device. Different combinations of the status indications have different weights for the status factor of the device.

Another example factor is an actual state of the device as determined by the image analysis of an image of the device or a portion thereof supplied by an imaging device associated with the device. For example, the image analysis may show that the device has less than a threshold amount of paper, or that the device has a red indication on the screen that is not communicated in the device-provided status information, or that a paper path does not appear to be moving, and many other such aspects or features that can be extracted through image analysis. Different combinations of the analyzed features have different weights for the actual state factor of the device.

Another example factor is an actual state of the device as determined by a user input relative to an image of the device or a portion thereof supplied by an imaging device associated with the device. For example, once an image of a device or a portion thereof is available at an embodiment, the embodiment allows the user to visually analyze the image and provide an input. As a non-limiting example, the user input may indicate a level preference for the device in some suitable manner. Different user inputs, such as different levels of preference, may have different weights for the actual state factor of the device.

An embodiment combines the weighted set of factors to compute a ranked list of devices in the subset. The embodiment selects the device that has the highest rank in the subset.

One embodiment further sends the user's job to the selected device. Another device directs the user to the selected device. Another embodiment indicates compatibility between the selected device and an intended use by the user.

In one embodiment, when the user's job is sent to the selected device, the embodiment causes the selected device to withhold processing the job until the embodiment triggers the job execution. The embodiment detects when the user has traveled to within another specified distance of the selected device. When the user is within that specified distance of the selected device, the embodiment sends a message to the selected device, triggering the job execution.

For example, when the embodiment has selected a printer, the embodiment sends the user's print job to the selected printer. The embodiment causes the selected printer to hold the user's job in the printer's queue without printing the print job. When the user walks over to the selected printer and is near the selected printer, the embodiment sends a message to cause the selected printer to remove the print job from the queue and execute the print job.

A method of an embodiment described herein, when implemented to execute on a device or data processing system, comprises substantial advancement of the functionality of that device or data processing system in selecting a device in an IoT environment. For example, a prior-art method of device selection fails to provide an actual state of the various devices to supplement the device-provided status information. Lacking such actual state information, users are often unable to use the selected device due to a physical condition of the device that is not reported in the status information. An embodiment selects a device in a given environment based not only on the basis of the device-provided status information but also based on image data collected by an imaging device associated with the device. An embodiment further analyzes the image to determine an actual physical state of the device. An embodiment selects the device subject to weighting a set of factors, which includes but is not limited to an image-based actual state of the device. Such a manner of selecting a device in a given IoT environment is unavailable in presently available devices or data processing systems. Thus, a substantial advancement of such devices or data processing systems by executing a method of an embodiment is in providing improved information for selecting a device from several possible devices for a task, thereby improving the reliability of the selected device's ability to complete the task.

The illustrative embodiments are described with respect to certain location detection methods, status information, actual state or conditions of devices, factors, weights, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
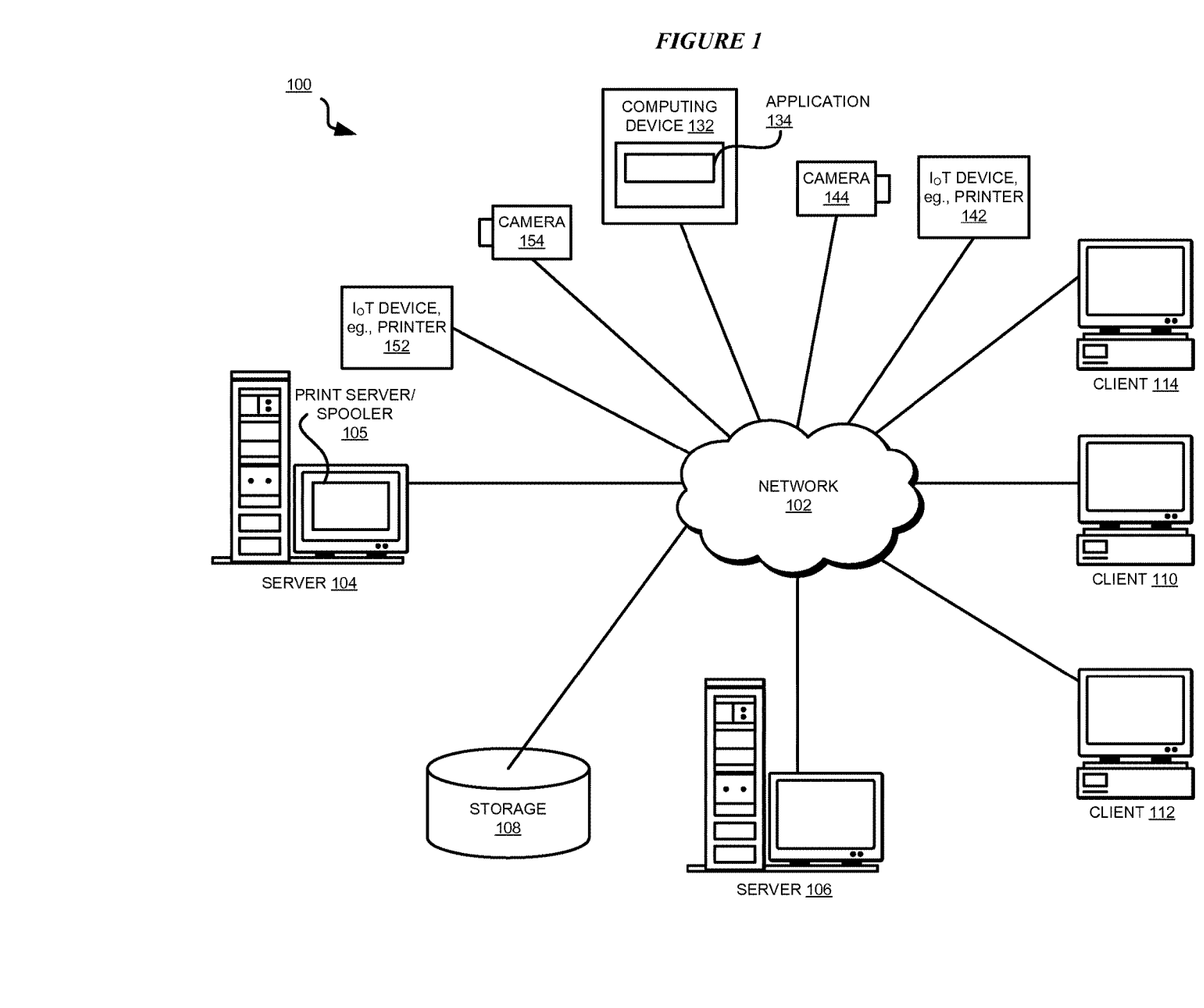
FIG. 1 depicts a block diagram of a network of data processing systems in which illustrative embodiments may be implemented.
Figure 2:
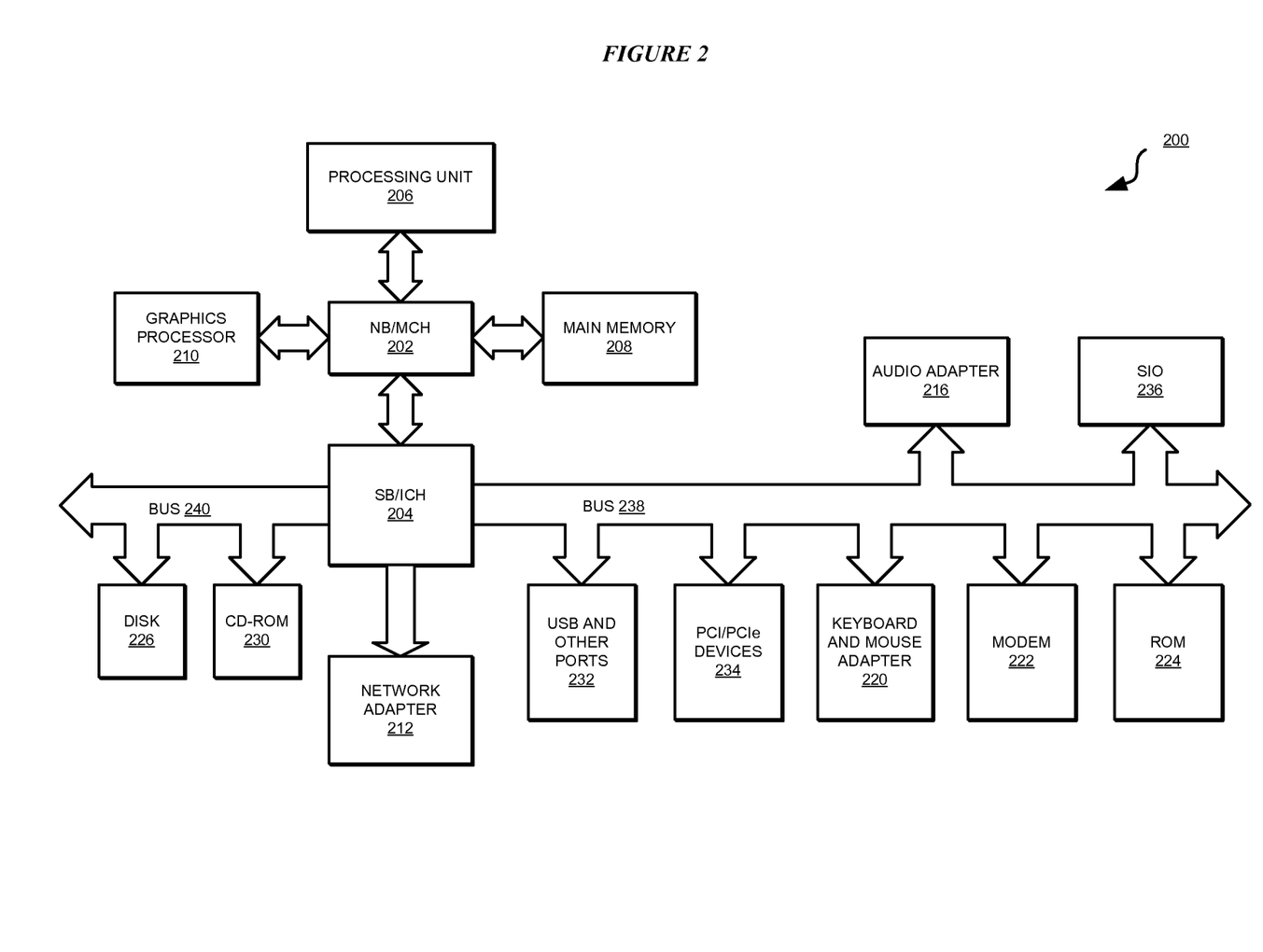
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a computing device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 132 implements an embodiment described herein in computing device 132 of a user. Computing device 132 is usable for locating the user in an IoT environment, selecting an IoT device, determining a compatibility of the selected device and an action to be performed using device 132, sending an instruction for a job or a task to the selected IoT device, or a combination thereof. For example, printers 142 and 152 are some non-limiting examples of IoT devices from which application 134 can select a device in a manner described herein. Camera 144 is an example of an imaging device, which provides application 134 an image of an actual physical condition of device 142. Similarly, camera 154 is an example of an imaging device, which provides application 134 an image of an actual physical condition of device 152. A device, such as printer 142 or 152, provides device-provided status information to application 134 directly, or via print-server or spooler 105 over network 102.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 134 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
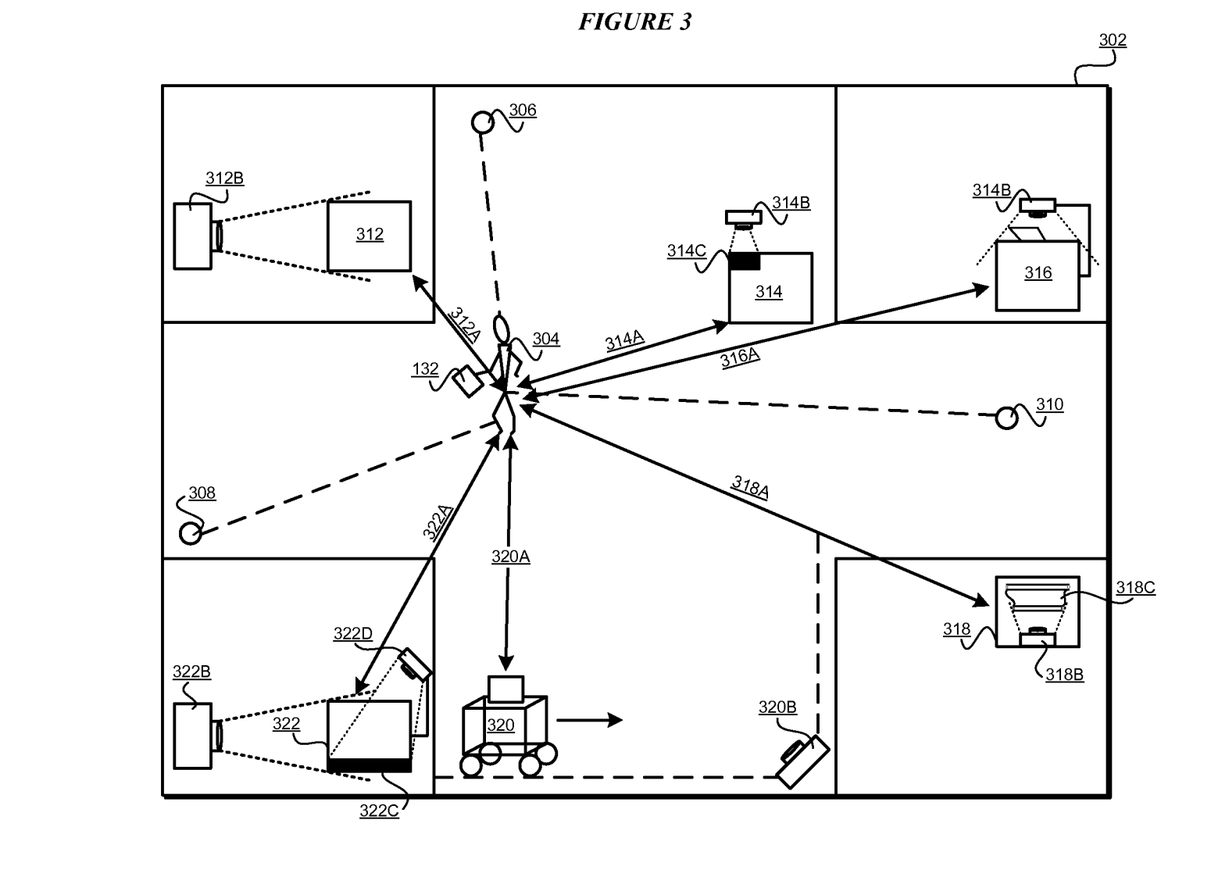
FIG. 3 depicts an example environment for selecting a device with visual confirmation in an IoT environment in accordance with an illustrative embodiment.

With reference to FIG. 3, this figure depicts an example environment for selecting a device with visual confirmation in an IoT environment in accordance with an illustrative embodiment. Map 302 is a simplified representation of the geographical area of a given IoT environment. For example, at a given time, a mobile human user is located in the physical three dimensional geographical environment in the real world. User 304 is a representation of the human user located in map 302 representation of the physical three dimensional geographical environment. As an example, the location of user 302 can be established using device 132 of FIG. 1 that is associated with the human user, and a set of access points, transceivers, beacons, readers, or other similarly usable near-field communication devices 306, 308, 310, in any suitable number or combination. In one example configuration, communication devices 306, 308, and 310 may be omitted when device 132 associated with user 304 can be tracked using GPS capability of device 132.

Assume that the IoT devices in the depicted circumstance are printers. Assume that an embodiment executing on device 132 of user 304 detects that user 304 has to send a print job to a printer. The embodiment determines that printers 312, 314, 316, 318, 320, and 322 are available within a device distance threshold. Printer 312 is at a distance 312A from user 304, printer 314 is at a distance 314A from user 304, printer 316 is at a distance 316A from user 304, printer 318 is at a distance 318A from user 304, printer 320 is at a distance 320A from user 304, and printer 322 is at a distance 322A from user 304. Some devices may be fixed in their positions, e.g., printer 312 or 314, and their locations may be stored in a repository (not shown). Some devices, e.g., printer 320, might be mobile, and may be at distance 320A at the time of detection.

The embodiment determines a distance factor and a weight corresponding to each device. For example, the distance factor of printer 312 may be weighted the highest for being the closest at the time when user 304 is positioned as shown. Similarly, the distance factor of printer 318 may be weighted the lowest for being the farthest at the time when user 304 is positioned as shown.

The embodiment receives device-appropriate additional information from the IoT devices to evaluate other factors for weighting. For example, when the devices are printers as depicted, the embodiment also receives the print queue information from printers 312-322. The embodiment assigns weights to the queue factors of each printer 312-322 depending upon a number and size of the jobs that are waiting in a queue at the time.

As another example, when the devices are printers as depicted, the embodiment also receives the printer status information from printers 312-322. The embodiment assigns weights to the one or more status factors of each printer 312-322 depending upon the particular status information considered and measured at the time.

The embodiment further receives an actual state information of a device. For example, when the devices are printers as depicted, the embodiment also receives the printers' actual physical state information from the imaging devices associated with printers 312-322. As one example, camera 312B is mounted separately from printer 312, has entire printer 312 in view, and sends an image of that view of printer 312. As another example, camera 314B has screen 314C of printer 314 in view and sends an image of that view of printer screen 314C.

Similarly, as an example, camera 316B is mounted on printer 316, has an output tray of printer 316 in view and sends an image of that view of printer 316. As another example, camera 318B is mounted inside printer 318, has paper path 318C of printer 318 in view, and sends an image of that view of printer 318. As another example, camera 320B has a view of a space in which printer 320 transits. Camera 320B sends whatever view of printer 320 it has at the time. As another example, camera 322B is mounted separately from printer 322, and has entire printer 322 in view. Camera 322C is mounted on or near printer 322, and has paper tray 322D in view. Cameras 322B and 322D each sends an image of their respective view of printer 322.

One embodiment presents the received images to the human user, and the human user provides an input to the embodiment to select one of printers 312-322 according to the images. The embodiment assigns a weight to the actual status factor of the selected printer according to the input. Another embodiment analyzes the images from cameras 312B, 314B, 316B, 318B, 320B, 322B, and 322D, and assigns weights to the one or more actual state factors of each printer 312-322 depending upon the features of those printers extracted from image analysis of the received images.

Figure 4:
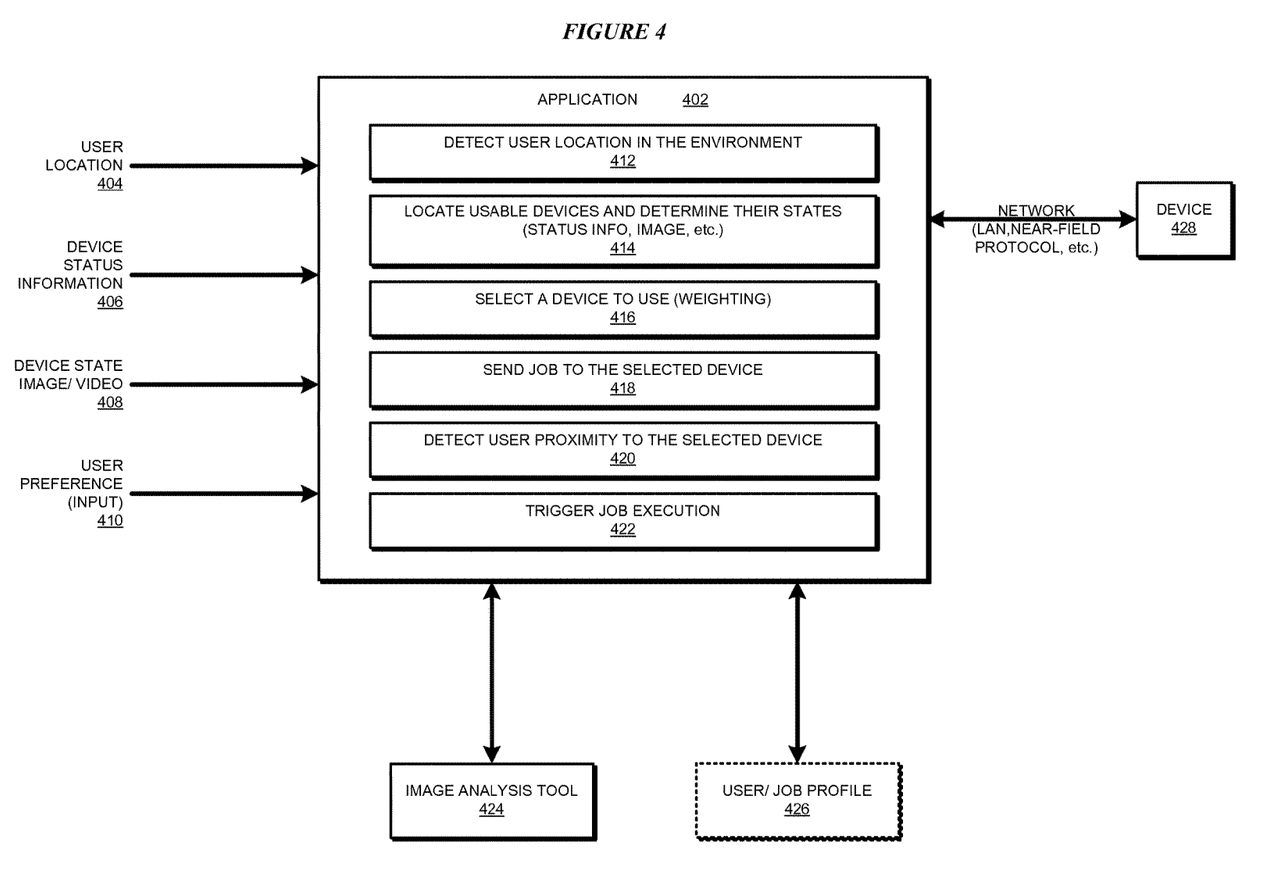
FIG. 4 depicts a block diagram of an example configuration for selecting a device with visual confirmation in an IoT environment in accordance with an illustrative embodiment.

With reference to FIG. 4, this figure depicts a block diagram of an example configuration for selecting a device with visual confirmation in an IoT environment in accordance with an illustrative embodiment. Application 302 is an example of application 134 in FIG. 1.

Application 402 receives user location 404 as one input. Application 402 receives device-provided status information 406 from one or more devices, such as one or more printer status information from one or more of printers 312-322 in FIG. 3. Application 402 receives image or video input 408 from one or more imaging devices associated with one or more devices, such as from one or more cameras associated with one or more of printers in FIG. 3.

Optionally, user input 410, which may be an indication of a preference of the user, may also be received at application 402. For example, user input 410, when available, selects one or more of images 408 as described herein.

Component 412 detects the user's location in the given environment, such as by using input 404 and plotting a corresponding position on a map.

Component 414 locates available devices in the given environment, such as within a threshold distance from the user. Component 414 also determines which of the available devices are usable for the user's purpose. For example, component 414 uses user or job profile 426 to determine the usability of an available device in a manner described herein.

Component 414 determines the available and usable devices' status information, actual physical state information using inputs 406 and 408 as described earlier. For example, component 414 uses image analysis tool 424 to extract one or more feature of a device in a manner described herein. Component 414 plots the available and usable devices on the map.

Component 416 selects a device to use. For example, component 416 computes the weights of each factor in a set of factors associated with each available and usable device. Component 416 applies the weights to their corresponding factors, and selects that device from the available and usable devices, which has the highest overall weight. The overall weight is computed using the weighted factor in a suitable mathematical expression.

Component 418 sends the user's job, or an instruction corresponding to the user's task, to the selected device, such as to device 428. Device 428 operates on a suitable network, such as on a LAN or using a near-field network. Component 420 detects the user's proximity to the selected device at a second time. For example, component 420 detects that the user is within a second threshold distance from device 428.

When the user is within a second threshold distance from device 428, component 422 triggers the job execution at device 428. For example, component 418 sends the job instruction to device 428 with a second instruction to hold the job at device 428 and withhold the execution of the job instruction. Component 422 supplies a third instruction to device 428 to begin executing the held job instruction.

Figure 5:
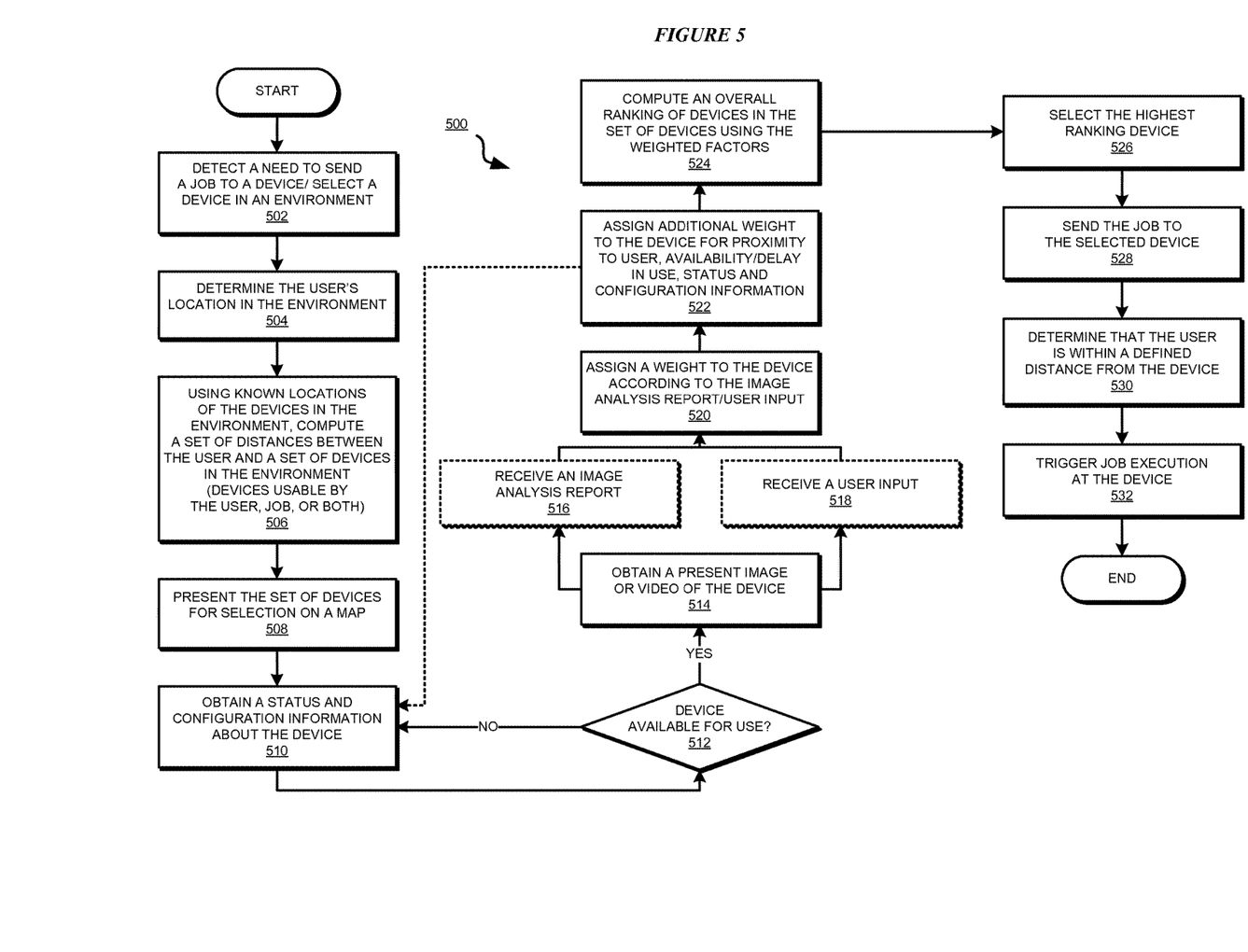
FIG. 5 depicts a flowchart of an example process for selecting a device with visual confirmation in an IoT environment in accordance with an illustrative embodiment.

With reference to FIG. 5, this figure depicts a flowchart of an example process for selecting a device with visual confirmation in an IoT environment in accordance with an illustrative embodiment. Process 500 can be implemented in application 402 in FIG. 4.

The application detects a need to send a user's job to an IoT device, or to otherwise select an IoT device in a given IoT environment (block 502). The application determines the user's location in the environment (block 504).

Using known locations of the devices in the environment, the application computes a set of distances between the user and a set of devices usable by the user and/or the user's task in the environment (block 506). The application presents the set of devices for selection on a map relative to the user (block 508).

The application obtains device-provided status information, configuration information, or both from a device (block 510). The application determines whether the device is available for use at the time (block 512). If the device is not available for use at the time for any reason ("No" path of block 512), the application returns to block 510 and selects another device to obtain the information. If the device is available for use at the time for any reason ("Yes" path of block 512), the application obtains a most recent image or video of the device or a portion thereof (block 514).

The application executes block 516, or 518, or both depending upon the circumstances of a particular implementation. For example, the application receives an image analysis report on the image or video received in block 514 (block 516). Alternatively, or together therewith, the application receives a user input relative to the image or video of block 514, or relative to an extracted feature thereof (block 518).

The application assigns a weight to the device according to the image analysis report or the user input, or both (block 520). The application assigns additional weights to other factors of the devices as described earlier (block 522). The application repeats blocks 510-522 for the as many devices as may be usable in the environment. In one embodiment, the input of block 518 may be delayed until all usable devices have been processed in this manner.

The application uses the weighted factors to compute an overall ranking of the devices in the set of devices (block 524). The application selects the highest ranking device (block 526). The application sends the job, or an instruction corresponding to the job, to the selected device (block 528).

The application determines that the user has traveled within a defined distance from the selected device at a second time (block 530). The application triggers the execution of the previously sent job or the job instruction at the selected device (block 532). The application ends process 500 thereafter.

Figure 6:
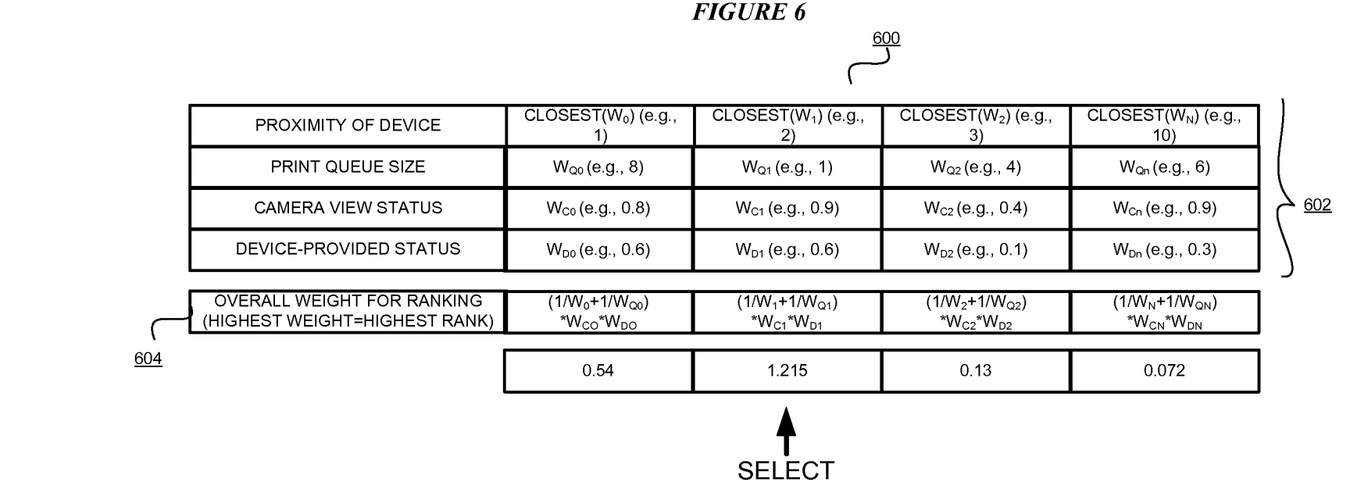
FIG. 6 depicts an example table for weight-based selection of a device in an IoT environment in accordance with an illustrative embodiment.

With reference to FIG. 6, this figure depicts an example table for weight-based selection of a device in an IoT environment in accordance with an illustrative embodiment. Table 600 can be used in blocks 520-526 in process 500 in FIG. 5. Table 600 can be formed and used by component 416 in application 402 FIG. 4.

As can be seen from the non-limiting example of table 600, n devices are located in the environment from which a user can select the most suitable device. Rows 602 show some non-limiting example weights assigned to the n available and usable devices in a manner described herein. Row 604 depicts a non-limiting example computation of an overall weight as described herein. From the example computation shown in this figure, an embodiment selects the highest weighted device, which need not be the nearest device.

Thus, a computer implemented method, system or apparatus, and computer program product are provided in the illustrative embodiments for selecting a device with visual confirmation in an IoT environment. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for selecting a device in an Internet of Things (IoT) environment, the method comprising:
   determining that an instruction has to be sent for processing in the IoT environment;
   locating, relative to a mobile data processing system a set of devices in the IoT environment, wherein the set of devices includes the device and each device in the set of devices can execute the instruction for a similar outcome;
   collecting, for each device in a subset of the set of devices, a set of factors, the set of factors including a first factor representative of an image of a portion of each device, a second factor including a distance of the device from the mobile data processing system, a third factor including a delay at the device due to a queue of instructions pending at the device, and a fourth factor including a status of the device as determined by configuration information supplied by the device;
   performing image analysis on the image of the portion of the device for each device to extract a feature in the image of the portion of the device to determine the first factor, wherein the feature includes information indicative of an actual operating state of the device at a first time;

assigning, for the device, a first weight to the first factor of the device;

computing a first overall rank for the device by a weighted combination of the first factor, the second factor, the third factor, and the fourth factor of the device;

assigning, for another device, a second weight to the first factor of the another device;

computing a second overall rank for the another device by a weighted combination of the first factor, the second factor, the third factor, and the fourth factor of the other device;

selecting, responsive to the first overall rank being greater than the second overall rank, the device from the subset as a target for sending the instruction;

sending the instruction to the device;

sending a second instruction to the device, the second instruction causing the device to withhold executing the instruction;

detecting that the mobile data processing system is within a specified distance of the device at a second time; and sending, responsive to the detecting that the mobile data processing system is within the specified distance of the device at the second time, a third instruction to the device, the third instruction causing the device to schedule the instruction for execution.

2. The method of claim 1, further comprising:
assigning, for the device, a third weight to the second factor in the set of factors of the device;
assigning, for the other device, a fourth weight to the second factor in the set of factors of the other device;
computing the first overall rank of the device relative to the second overall rank of the other device in the subset of devices, the computing using the first and the third weights for the device and the computing using the second and the fourth weights for the other device, wherein the selecting is responsive to the first overall rank of the device being higher than the second overall rank of the other device.

3. The method of claim 2, further comprising:
assigning, for the device, a fifth weight to the third factor in the set of factors of the device;
assigning, for the other device, a sixth weight to the third factor in the set of factors of the other device;
using, in computing the first overall rank of the device relative to the second overall rank of the other device in the subset of devices, the fifth weight for the device and the sixth weight for the other device.

4. The method of claim 2, further comprising:
assigning, for the device, a seventh weight to the fourth factor in the set of factors of the device;
assigning, for the other device, an eighth weight to the fourth factor in the set of factors of the other device;
using, in computing the first overall rank of the device relative to the second overall rank of the other device in the subset of devices, the seventh weight for the device and the eighth weight for the other device.

5. The method of claim 1, further comprising:
receiving a user input relative to the image of the portion of the device, the user input assigning a desirability rating to the feature in the image of the portion of the device.

6. The method of claim 1, further comprising:
selecting the subset of device responsive to determining that only the subset of devices from the set of devices is usable for the instruction.

7. The method of claim 1, further comprising:
configuring corresponding to each device in the set of devices, an imaging device, wherein the imaging device is oriented to capture an image of at least a portion of the corresponding device.

8. The method of claim 7, wherein the imaging device provides the image of the portion of the corresponding device in response to a request for the image.

9. The method of claim 7, wherein the imaging device provides the image of the portion of the corresponding device periodically.

10. The method of claim 7, wherein the imaging device is mounted within the corresponding device, wherein the portion of the device is within the device and unobservable from an external view of the corresponding device.

11. The method of claim 7, wherein the imaging device is dedicated to imaging the corresponding device.

12. The method of claim 7, wherein the imaging device is configured to image a geographical area, wherein the corresponding device is situated in the geographical area causing the imaging device to capture the image of the corresponding device.

13. The method of claim 1, further comprising:
detecting that the mobile data processing system is located at a location in the IoT environment at a given time, wherein the instruction has to be sent from the computing device;
setting a distance threshold from the computing device, wherein each device in the set of devices is located within the distance threshold from the location of the computing device.

14. The method of claim 13, wherein the threshold distance is a vertical distance spanning a plurality of floors in a building.

15. The method of claim 1, wherein the method is embodied in a computer program product comprising one or more computer-readable storage devices and computer-readable program instructions which are stored on the one or more computer-readable tangible storage devices and executed by one or more processors.

16. A computer program product for selecting a device in an Internet of Things (IoT) environment, the computer program product comprising one or more computer-readable storage devices, and program instructions stored on at least one of the one or more storage devices, the stored program instructions comprising:
program instructions to determine that an instruction has to be sent for processing in the IoT environment;
program instructions to locate, relative to a mobile data processing system a set of devices in the IoT environment, wherein the set of devices includes the device and each device in the set of devices can execute the instruction for a similar outcome;
program instructions to collect, for each device in a subset of the set of devices, a set of factors, the set of factors including a first factor representative of an image of a portion of each device, a second factor including a distance of the device from the mobile data processing system, a third factor including a delay at the device due to a queue of instructions pending at the device, and a fourth factor including a status of the device as determined by configuration information supplied by the device;

program instructions to perform image analysis on the image of the portion of the device for each device to extract a feature in the image of the portion of the device to determine the first factor, wherein the feature includes information indicative of an actual operating state of the device at a first time;

program instructions to assign, for the device, a first weight to the first factor of the device;

program instructions to compute a first overall rank for the device by a weighted combination of the first factor, the second factor, the third factor, and the fourth factor of the device;

program instructions to assign, for another device, a second weight to the first factor of the another device;

program instructions to compute a second overall rank for the another device by a weighted combination of the first factor, the second factor, the third factor, and the fourth factor of the other device;

program instructions to select, responsive to the first overall rank being greater than the second overall rank, the device from the subset as a target for sending the instruction;

program instructions to send the instruction to the device;

program instructions to send a second instruction to the device, the second instruction causing the device to withhold executing the instruction;

program instructions to detect that the mobile data processing system is within a specified distance of the device at a second time; and program instructions to send, responsive to the detecting that the mobile data processing system is within the specified distance of the device at the second time, a third instruction to the device, the third instruction causing the device to schedule the instruction for execution.

17. A computer system for selecting a device in an Internet of Things (IoT) environment, the computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to determine that an instruction has to be sent for processing in the IoT environment;

program instructions to locate, relative to a mobile data processing system a set of devices in the IoT environment, wherein the set of devices includes the device and each device in the set of devices can execute the instruction for a similar outcome;

program instructions to collect, for each device in a subset of the set of devices, a set of factors, the set of factors including a first factor representative of an image of a portion of each device, a second factor including a distance of the device from the mobile data processing system, a third factor including a delay at the device due to a queue of instructions pending at the device, and a fourth factor including a status of the device as determined by configuration information supplied by the device;

program instructions to perform image analysis on the image of the portion of the device for each device to extract a feature in the image of the portion of the device to determine the first factor, wherein the feature includes information indicative of an actual operating state of the device at a first time;

program instructions to assign, for the device, a first weight to the first factor of the device;

program instructions to compute a first overall rank for the device by a weighted combination of the first factor, the second factor, the third factor, and the fourth factor of the device;

program instructions to assign, for another device, a second weight to the first factor of the another device;

program instructions to compute a second overall rank for the another device by a weighted combination of the first factor, the second factor, the third factor, and the fourth factor of the other device;

program instructions to select, responsive to the first overall rank being greater than the second overall rank, the device from the subset as a target for sending the instruction;

program instructions to send the instruction to the device;

program instructions to send a second instruction to the device, the second instruction causing the device to withhold executing the instruction;

program instructions to detect that the mobile data processing system is within a specified distance of the device at a second time; and program instructions to send, responsive to the detecting that the mobile data processing system is within the specified distance of the device at the second time, a third instruction to the device, the third instruction causing the device to schedule the instruction for execution.

* * * * *